United States Patent
Powell et al.

(10) Patent No.: US 6,768,223 B2
(45) Date of Patent: Jul. 27, 2004

(54) APPARATUS AND METHOD FOR RAPID FAULT DETECTION AND TRANSFER IN A UTILITY-INTERACTIVE UNINTERRUPTIBLE POWER SUPPLY

(75) Inventors: Jeffrey M. Powell, Lewis Center, OH (US); Robert W. Baker, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 461 days.

(21) Appl. No.: 09/872,944

(22) Filed: Jun. 1, 2001

(65) Prior Publication Data

US 2002/0011752 A1 Jan. 31, 2002

Related U.S. Application Data

(60) Provisional application No. 60/208,617, filed on Jun. 1, 2000.

(51) Int. Cl.[7] .................................................. H02J 7/00
(52) U.S. Cl. ....................................................... 307/64
(58) Field of Search ............................ 307/64, 43, 70, 307/80, 87, 42; 363/37, 34

(56) References Cited

U.S. PATENT DOCUMENTS

| | | | |
|---|---|---|---|
| 4,366,389 A | 12/1982 | Hussey | 307/66 |
| 4,366,390 A | 12/1982 | Rathmann | 307/66 |
| 4,556,802 A | 12/1985 | Harada et al. | 307/66 |
| 4,782,241 A | 11/1988 | Baker et al. | 307/66 |
| 5,315,533 A | 5/1994 | Stich et al. | 700/298 |
| 5,686,768 A | 11/1997 | Thomsen et al. | 307/64 |
| 6,051,893 A | * 4/2000 | Yamamoto et al. | 307/43 |
| 6,295,215 B1 | * 9/2001 | Faria et al. | 363/37 |

FOREIGN PATENT DOCUMENTS

| | | | |
|---|---|---|---|
| EP | 0514171 | 11/1992 | H02J/9/06 |
| JP | 02214430 | 8/1990 | H02J/9/06 |
| JP | 02250626 | 10/1990 | H02H/7/12 |
| JP | 03030513 | 2/1991 | H03K/17/78 |
| JP | 05075107 | 3/1993 | H01L/29/74 |
| JP | 08084444 | 3/1996 | H02J/9/00 |
| JP | 2000152646 | 5/2000 | H02M/7/48 |

OTHER PUBLICATIONS

American Power Conversion, "The Ideal Green UPS", undated but publicly available as of Apr. 28, 2000 (published by American Power Conversion, West Kingston, RI).

European Patent Office Search Report in Counterpart Case 01 20 2133.

* cited by examiner

*Primary Examiner*—Gregory J. Toatley, Jr.
(74) *Attorney, Agent, or Firm*—Howrey Simon Arnold & White LLP (57) ABSTRACT

A method and apparatus are disclosed for improving the disturbance pass through characteristics of a line interactive uninterruptible power supply ("UPS"). One disclosed technique uses a naturally commutated fast utility disconnect switch, wherein the switch is self commutated by the UPS inverter forcing the current through the switch to zero. A second disclosed technique uses a gate commutated fast utility disconnect switch and the associated snubber circuits, wherein the fast utility disconnect is opened quickly upon occurrence of a line fault and the energy generated in interrupting the line current is dissipated by the snubber circuits.

21 Claims, 11 Drawing Sheets

APPARATUS AND METHOD FOR RAPID FAULT DETECTION AND TRANSFER IN A UTILITY-INTERACTIVE UNINTERRUPTIBLE POWER SUPPLY

CROSS REFERENCE TO RELATED APPLICATION AND PRIORITY CLAIM

This application claims the benefit of Provisional U.S. patent application Ser. No. 60/208,617, entitled "Apparatus And Method For Rapid Fault Detection And Transfer In A Utility-Interactive Uninterruptible Power Supply", naming the same inventors as identified herein and filed Jun. 1, 2000.

BACKGROUND OF THE INVENTION

The double conversion topology has been the uninterruptible power supply (UPS) standard for high performance topologies for the last 30 years. Double conversion provides the ultimate isolation of the critical load from the anomalies present on the utility electric lines. Some drawbacks of the double conversion topology are that the input rectifiers tend to draw currents at poor power factors and also tend to introduce harmonics, and performance is inconsistent throughout the load range. Filters improve the performance of double conversation systems but do not remedy it.

Recently, another topology has been presented for use as a high performance topology suitable for critical loads. The utility interactive topology does indeed have appeal as it provides the ideal load to the utility, drawing power at near unity power factor and at low harmonic distortion throughout its load range. Additionally, utility interactive topologies exhibit greater efficiencies than the classic double conversion topologies for certain load types. On the downside, utility interactive topologies do not protect the critical load as well from utility line anomalies. Among other shortcomings, certain types of utility faults will pass through the utility interactive system and disturb the critical load. The occasional passing through of utility line faults with this topology is due to the inability of the input coupling switch to disconnect in a quick enough fashion. Ordinary inverse-parallel connected thyristors are often used for this purpose due to their characteristics that make them very well suited for this application. Unfortunately, one drawback of thyristors is that they cannot achieve the off or blocking state without having the applied current achieve a zero value.

SUMMARY OF THE INVENTION

An object of the present invention is to ameliorate the system output waveform disruptions that occur due to input utility line disturbances. The pass through of disturbances that can not be sufficiently attenuated by the normal operation of the utility interactive power converter can only be stopped by rapid disconnection of the input coupling switch means. Two techniques are disclosed that accomplish this. The first technique is suitable for use with switches that require the current to achieve zero for commutation, such as thyristors-Silicon Controlled Rectifiers (SCRs), for example. This technique operates one or both of the inverters in such a manner to cause the line current to achieve zero value in a time period during which the net output disturbance is of little concern. The second technique uses a switch that can be self commutated or uses a non self-commutating switch with auxiliary commutation circuit elements. Also disclosed are several variations of a voltage clamping scheme that is required to deal with the energy released by the line circuit inductances during commutation.

DESCRIPTION OF ILLUSTRATIVE EMBODIMENTS

The mission of an uninterruptible power supply (UPS) is to protect a critical load from all power disturbances present on the utility power grid. The UPS accomplishes this result by providing a steady, continuous power supply. Several types of utility disturbances are commonly found, including transients, sags, surges, brownouts, blackouts and faults.

Utility faults are short circuits that occur when a phase line is inadvertently connected to a neutral (or ground) or to different phase line. Fault conditions can occur anywhere in a power grid, and may be caused by auto accidents, lightning, activities in-plant or within neighboring or remote plants.

In the case of phase-to-neutral faults, the phase and neutral voltages will move close together. This will last for a limited period of time and then be terminated by an upstream overcurrent protective device opening at least the faulted phase. Because of the massive energy concentration at the fault, the fault may disconnect itself before any protective action. It should be noted that no matter what happens, all the downstream loads remain connected. Consequently, during the fault the UPS feeder remains in a low impedance state and appears as a short circuit Open circuit, high impedance utility failures are unusual.

In the case of phase-to-phase faults, a shorted condition causes both phase voltages to move together and behave as one. This presents an apparent phase shift and an averaging of the voltages. As before, the fault may clear itself If a circuit breaker is upstream of the fault then all three phases could open, likely in an erratic fashion because of arcing in the breaker. If fuses are upstream of the fault then other possibilities exist. The shorted phases may both open or one of the two phases may open.

Figure 1:
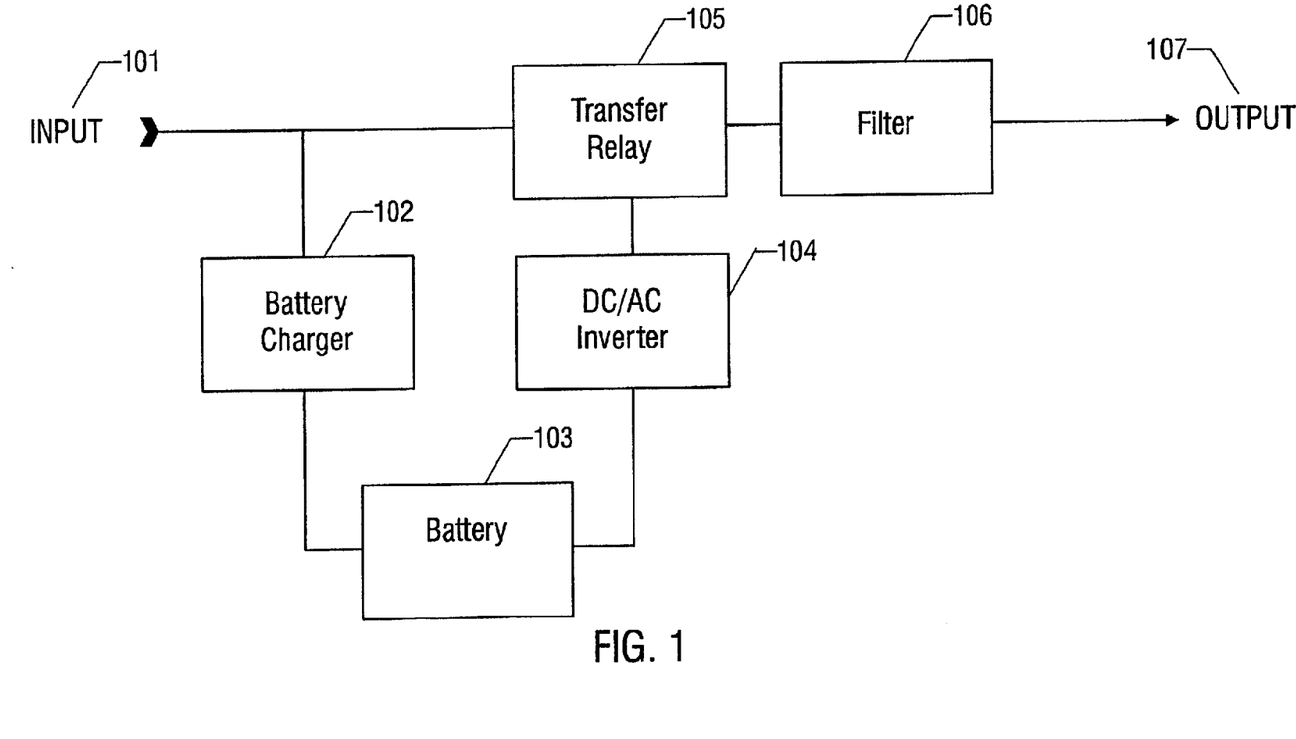
FIG. 1 is a high level block diagram of a typical offline UPS.

The simplest type of UPS is the off-line topology, shown in FIG. 1. Under normal operating conditions, AC power from the utility passes from the input 101 straight through the UPS to the critical load connected to output 107. A charger 102 or "4-quadrant converter" converts AC power from input 101 to DC power to charge battery 103. Inverter 104 converts DC power from the battery to AC power that supports the critical load when the utility fails. Normally inverter 104 is operating in the strand by mode, keeping the battery 103 charged. If the utility power goes out of tolerance, inverter 104 powers the load, drawing energy from the battery 103.

The off-line topology is labelled "single-conversion" because power is converted only one time. When the normal power source is available, a small amount of power is converted from AC to DC to maintain battery charge. When input AC power goes out of tolerance, the UPS converts DC battery power to AC to support the load. During the transition from normal power to battery power, there is an output voltage disturbance as the output inverter changes from idling to carrying 100% of the connected load.

A single conversion UPS is inexpensive and efficient in normal operation. It is ideal for home use or for powering individual computer workstations running non-critical applications that only require outage protection. Single conversion UPS products sometimes have surge suppression and/or "buck and boost" circuits to compensate for high or low input voltage, but otherwise do not provide significant input power conditioning.

Figure 2:
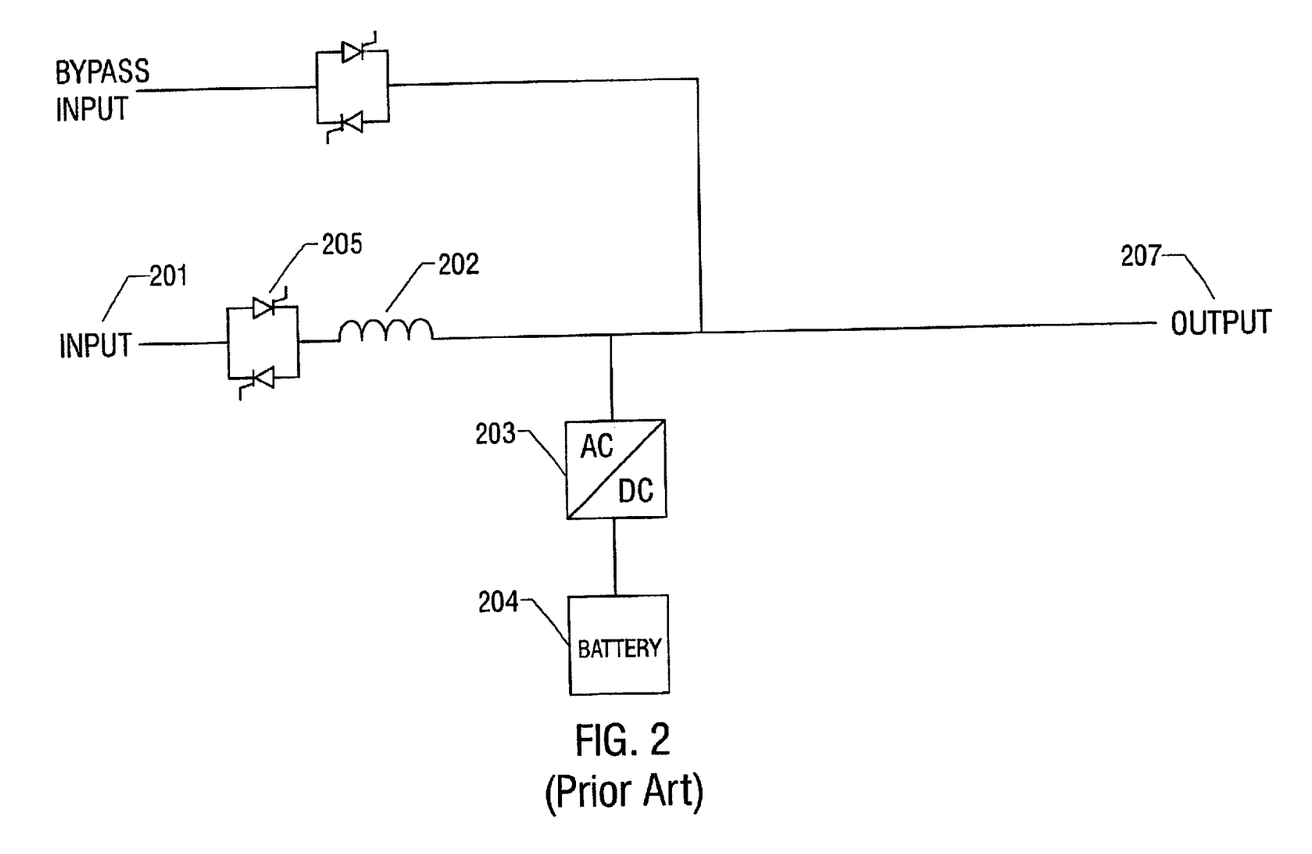
FIG. 2 is a high level block diagram of a typical line interactive UPS.

The next step upward is the line interactive topology, shown in FIG. 2. The line interactive topology resembles the offline topology, but includes a transformer or inductor 202 in series between the utility power source and the load. This inductor enables the UPS inverter 203 to "interact" with incoming power and provide power conditioning to the critical load. Typically the 4-quadrant inverters used in line interactive UPS are constant voltage devices. They adjust to shifting loads by changing their output phase angle. Because the phase angle cannot be shifted quickly without potential disruption of the critical load the difference in power required to compensate for the disturbance is extracted from the battery 204. The resulting frequent hits on the battery shorten battery life. Another limitation of line interactive products is that they cannot completely isolate the critical load from the input line without operating on battery power. Small frequency perturbations and power quality disturbances get passed directly to the critical load. Without electrical isolation, common-mode noise also passes right through the UPS to the critical load.

Figure 3:
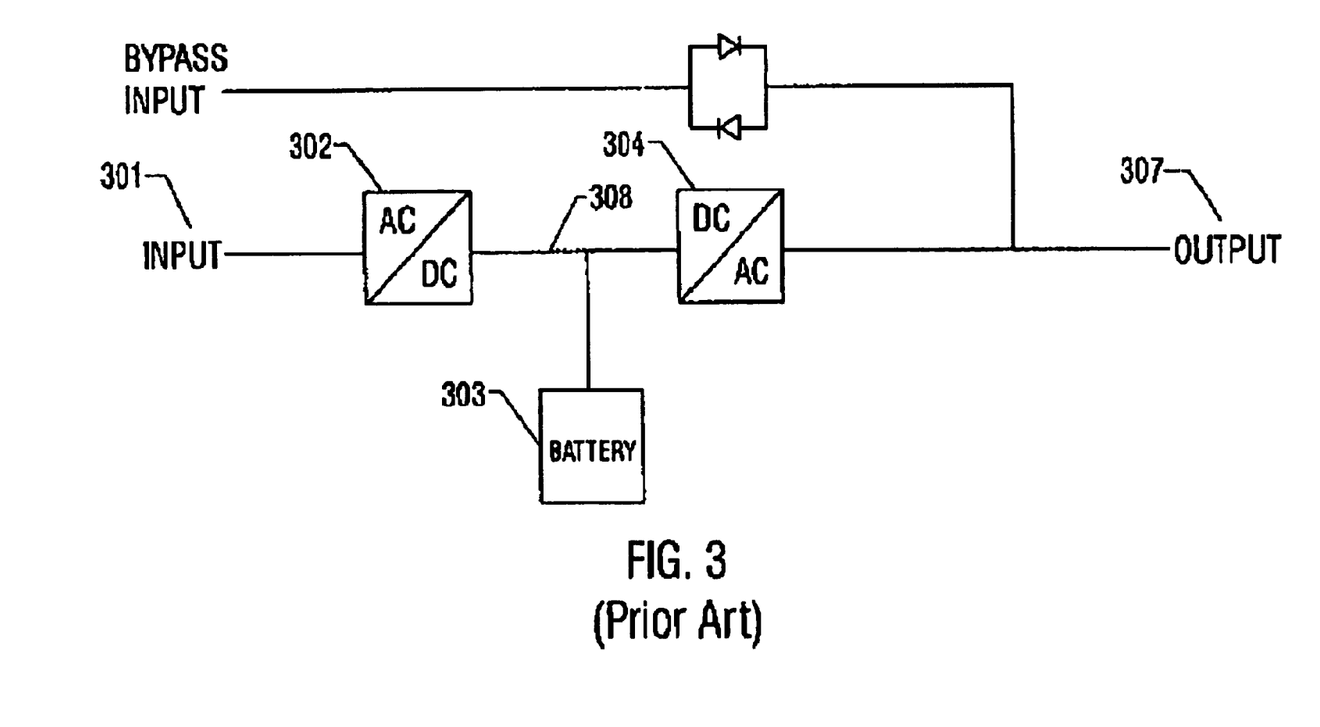
FIG. 3 is a high level block diagram of a typical online, double conversion UPS.

The premium UPS topology is the true on-line or double conversion UPS illustrated in FIG. 3. Input 301 is connected to rectifier 302, which rectifies incoming AC power to DC power to supply the internal DC bus 308 of the UPS. Output inverter 304 takes the DC power from DC bus 308 and produces AC power to support the critical load connected at output 307. Battery 303 is attached to DC bus 308 and is float charged during normal operation. When the input power is out of the tolerance limits, battery 303 provides power to support inverter 304 and the critical load. Some advantages of this configuration include: load isolation, output voltage stability, output voltage and frequency independence, capability for separate inputs for the normal and bypass source backfeed prevention, and mature and well-understood technology.

The traditional double conversion online UPS is designed to operate despite any type of utility line fault or other utility line disturbance. This operation results because the input rectifier 302 chops up the incoming utility voltage and turns it into direct current (DC) voltage for the battery 303. Within reason, battery 303 can tolerate minor disruptions on the energy supply.

The steady DC voltage produced by rectifier 302 or battery 303 is used to power output inverter 304. The inverter creates a completely new waveform for the critical load connected at output 307. In the double conversion online UPS the critical load output waveform has no necessary relationship to the incoming utility waveform. Consequently the output waveform remains independent of utility waveform disturbances.

The intermediate DC link between the input rectifier and the output inverter (i.e., DC bus 308) provides filtering and short term energy storage. A battery connection at this point provides longer term energy storage, enabling the UPS to ride through more significant utility line disturbances. Consequently, incoming line disturbances (other than long-term blackouts) have no effect on the critical load. Input faults are not a problem for double conversion UPS products. Input rectifier 302 only allows power flow in one direction, so an input line fault merely causes the unit to operate on battery power.

Figure 4:
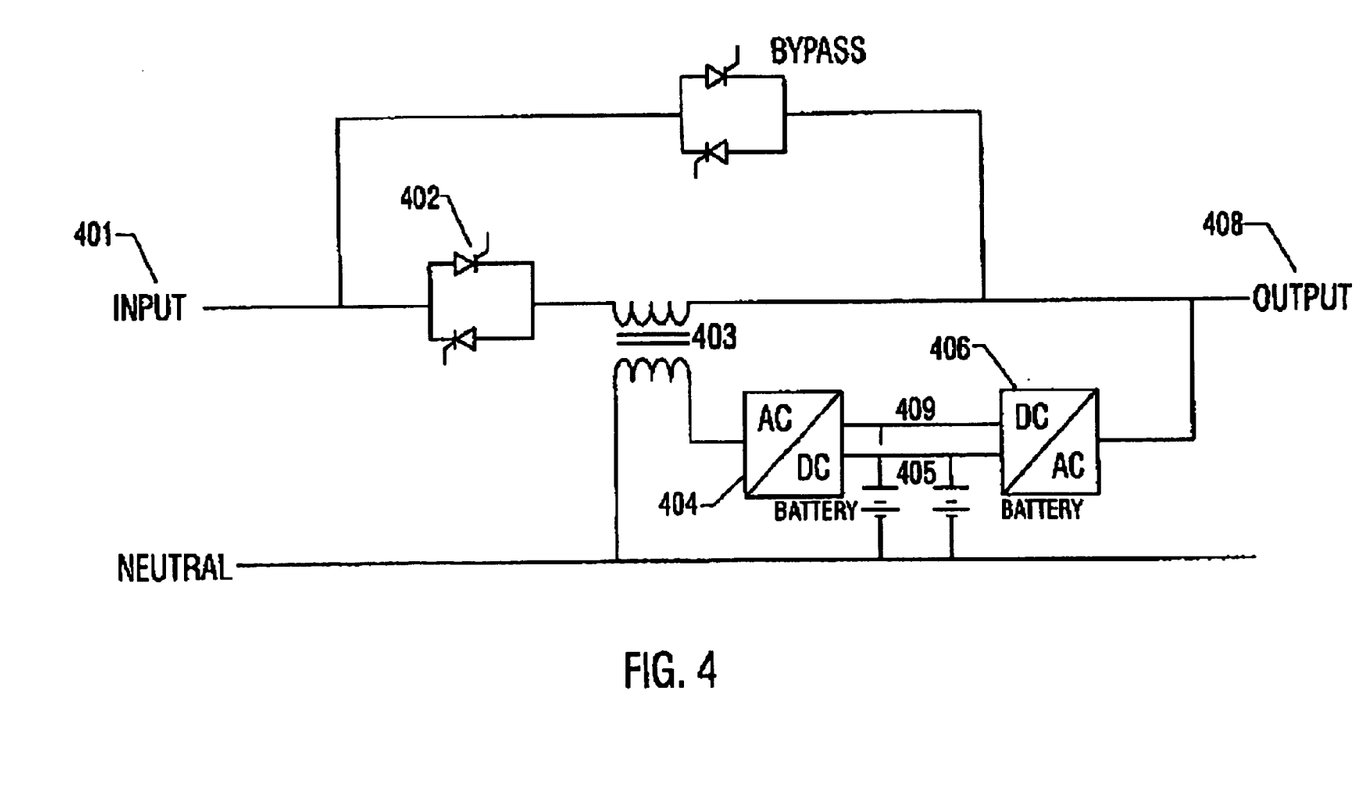
FIG. 4 is a high level block diagram of a delta conversion UPS.

One type of line interactive UPS is the delta conversion UPS, illustrated FIG. 4. The delta conversion UPS is a line-interactive UPS in the classic sense, meaning that the series transformer 403 and output inverter 406 interact with the incoming utility voltage to alter the output voltage. This topology has a small input buck/boost inverter 404 that modifies the input voltage. This small inverter 404 is referred to as a series inverter because it theoretically only processes the difference (the delta) between the actual input waveform and the "ideal" output waveform. The series inverter attaches to the DC bus 409, which it uses as a pipeline to exchange power with the output (main) inverter 406. Because the series inverter processes only the power difference in either direction, it is typically rated only for a small portion, e.g., 20%, of the rated UPS output.

In the normal mode (which means a nominal input waveform and a linear load on UPS), the utility disconnect static switch 402 is closed. Utility power is therefore supplied directly to the output 408.

When the input voltage is present but not at its nominal value, series inverter 404 injects a voltage into buck/boost transformer 403 to add or subtract from the input voltage. This creates a regulated output voltage, similar to some electronic voltage regulators.

When the input power goes out of tolerance limits, main inverter 406 will supply full output power. The utility disconnect static switch 402 is turned off to prevent back-feeding. Power failures that will activate main inverter 406 include the input voltage going outside the regulation range of series inverter 404 and deviations of the input power source frequency or phase angle.

Providing load harmonic current and power factor correction requires that main inverter 406 operate to inject the required compensation currents, either harmonic currents and fundamental frequency reactive currents. Series inverter 404 operates to correct the voltage. The function of the inverter in normal operation is to stabilize the output voltage and to supply reactive or harmonic power if so required by the load. The is amplitude and phase of the main inverter 406 can be controlled as to maintain the desired state of charge on the battery and thereby compensate for the power flow to or from the series inverter.

Like the offline UPS, the line interactive UPS can be efficient because it supports the entire critical load only during power disturbances. Compared to the offline UPS, the line interactive UPS pays a small efficiency penalty for the series inductor (or transformer) 403 and for losses associated with their power conditioning functions.

Line-interactive and offline UPS products are notoriously susceptible to input faults, which is why they typically have a utility disconnect static switch and fast blowing fuses on the input, attempting to prevent feeding power from the DC bus back to the utility. In a utility interactive UPS the utility waveform is used as the foundation to construct the output waveform. The utility interactive UPS makes modifications to the raw utility waveform to make that utility waveform more suitable as an output waveform for the critical load. For instance, if the incoming voltage is too low, voltage is added to raise the output voltage to the proper level. Similarly, incoming voltage that is too high is is reduced. Harmonics are subtracted from the input to present a cleaner sine wave at the output.

At first appearance this method seems to provide a high-efficiency, utility-friendly means to present a quality waveform to a critical load. It is very important, however, to recognize the limitations of this system. Because the output critical bus waveform is constructed from the utility sinewave, frequency independence is impossible without battery operation.

An analysis of a typical utility interactive UPS design illustrates that utility waveform corrections up to 20% of the input voltage can be made. The limit employed in such a system is arbitrary, and is typically chosen with cost in mind. For disturbances beyond the 20% limit, the UPS must disconnect the utility input and run on battery power. Under certain utility conditions, this results in repeated battery hits that shorten battery life. To compound the problem, under some utility conditions the UPS cannot disconnect the utility to shield the critical load from the disturbance. The present invention is directed to a solution to this second problem.

A utility interactive UPS must respond immediately and correctly to utility faults and other disturbances if the critical load is to receive quality output power. The control system must detect and analyze the disturbance, determine the appropriate response, and correct the utility waveform, all in sufficient time to keep the utility line disturbance from disrupting the critical load. Many utility disturbances occur very quickly placing severe design requirements on control and inverter performance.

Because the utility waveform must be corrected in real time, the input and output inverters and the rest of the power transfer system in the line interactive UPS must exhibit much higher performance than their counterparts in a double conversion online UPS. The control systems employed in utility interactive systems must make high-speed decisions not required of the traditional online UPS controllers. Because of technological limitations, disturbances that would be easily and intrinsically blocked by online systems will, in some cases, pass right through utility interactive systems, disrupting the critical load. Attempts to reduce pass through increases the complexity of utility interactive systems and may actually lower the overall expected reliability.

The ability of certain utility faults to propagate through the utility interactive UPS to the critical load is a result of its topology. For the output of the utility interactive UPS to remain undisturbed during significant utility disruptions, the utility must be disconnected and the critical load supplied by the battery via inverter operation. The limited ability to disconnect the utility during faults is a fundamental weakness of the prior art utility interactive UPS designs.

The typical prior art line interactive UPS, as illustrated in FIG. 2, has a utility disconnect 205, which is not self commutated and it does not ensure that inverter 203 is disconnected from input 201 quickly in the event of a fault. Certain types of faults, particularly line-to-line faults, can cause connected at output 207 the inverter fuses to blow. This unavoidably de-energizes the critical load, because the unit has no separate bypass line to which it can transfer. In other situations, the input fuses might blow, forcing the UPS to switch to battery power before eventually dumping the critical load.

While the propagation of certain utility faults and transients is typical of prior art utility interactive UPS designs, a solution is possible. A fast-utility-disconnect may be used in place of the common utility disconnect switch. The fast utility disconnect is a solid state static switch that rapidly disconnects the faulted input form the UPS and the critical load. The fast utility disconnect may be naturally commutated or self commutated. A naturally commutated utility disconnect may be constructed from thyristors, e.g., Silicon Controlled Rectifiers ("SCRs" ), connected in anti-parallel. A self commutated fast utility disconnect may be constructed from transistors, such as insulated gate bipolar transistors ("IGBTs") or metal oxide semiconductor filed effect transistors ("MOSFETs"), or other gate commutated switching devices. A fat utility disconnect may also be constructed from self commutated thyristors. If a self commutated fast utility disconnect is used, additional clamping circuitry is required. Descriptions of both embodiments follow below.

Figure 5:
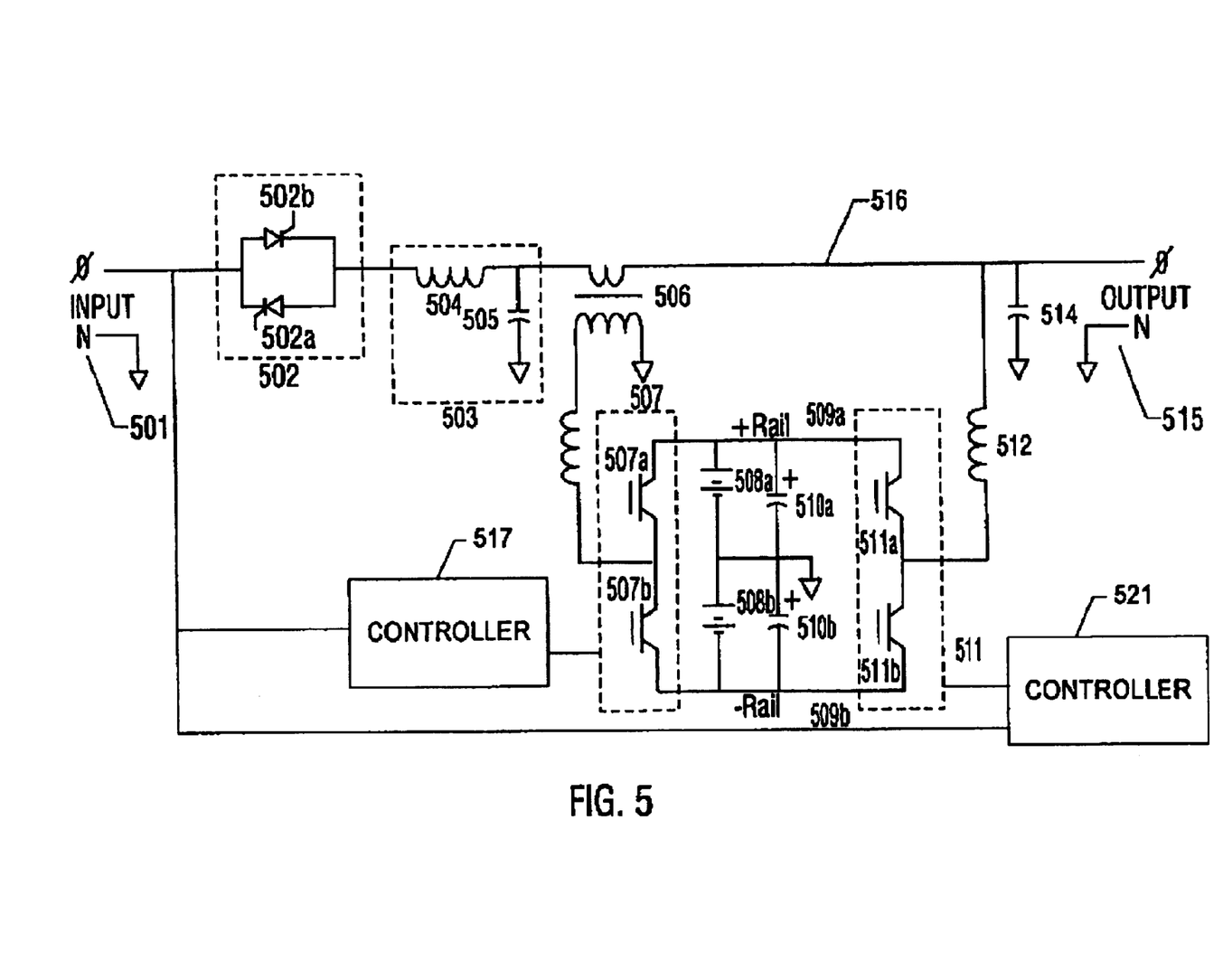
FIG. 5 is a one-line diagram of a line interactive, delta conversion UPS employing a naturally commutated fast utility disconnect switch in accordance with the present invention.

A simplified schematic of a utility interactive UPS employing one embodiment of the present invention is illustrated in FIG. 5. The illustrated circuit is a single phase circuit, but the invention and principles described below are equally applicable to a three phase circuit. Alternating current ("AC") power is received at input 501. The critical load to be powered is connected to the UPS at output 515.

During normal operation, AC power passes through a naturally commutated fast utility disconnect 502. The fast utility disconnect is comprised of two silicon controlled rectifiers ("SCRs") 502*a* and 502*b* connected in anti-parallel. In a three phase system, each phase of the fast utility disconnect would comprise a pair of anti-parallel-connected SCRS. The SCRs are gated to allow power to pass from input 501 to low-pass filter 503, which serves to provide some conditioning of the incoming voltage. Low-pass filter 503 is a second order filter comprised of inductor 504 and capacitor 505. Other filter designs which are well known to those of ordinary skill in the art may also be used.

AC power to be delivered to the critical load then passes through one winding of transformer 506, which is connected in series with the UPS bus 516. The purpose transformer 506 will be discussed in more detail below. The power for the critical load then passes to the critical load by way of capacitor 514, which serves to minimize the effects of load transients on the output voltage.

The second winding of transformer 506 is connected to inverter 507, which is called a "series inverter" Series inverter 507 is comprised of switching devices 507*a* and 507*b*, which are typically power transistors. In a three-phase system, six switching devices would be used, two per phase. One purpose of series inverter 507 is to make up any difference between the desired voltage at UPS output 515 and the voltage supplied at input 501. Inverter 507 also controls the input power factor of the UPS by drawing current from input 501 that is sinusoidal and in phase with the input voltage. Inverter 507, in conjunction with inverter 511, is also used to maintain the charge on battery 508. General principles related to design of such inverters and their controllers are well known to those of ordinary skill in the art.

The voltage generated by series inverter 507 is impressed between positive DC voltage rail 509a and negative DC voltage rail 509b, which serve as the DC bus for the UPS system. Battery string 508 comprising batteries 508a and 508b, is connected between these DC voltage rails, as are capacitors 510a and 510b, which serve to minimize voltage transients on the DC bus. Output inverter 511 also draws power from or supplies power to the DC bus depending on the mode of operation.

Inverter 511 is the main output inverter and is designed to provide full output power to the critical load connected at output 515. Output inverter 511 comprises two switching devices, illustrated as power transistors 511a and 511b. In a three phase system, a total of six power switching devices would be used, two for each phase. Inverter 511 keeps the output voltage stable and regulated, whether the system is running on AC power from input 501 or DC power from battery 508. If the AC power supplied at input 501 is within the appropriate tolerances for the critical load, then inverter, 511 is unloaded. Inverter 511 is operated to produce an acceptable voltage, and injects power and/or correction current to the UPS system bus through inductor 512, which serve to smooth the current supplied to the output. Design of such inverters and their controllers is well known to those of skill in the art.

When the input lines fail, it becomes necessary to disconnect the UPS from the input lines to prevent power generated by inverter 511 from backfeeding the faulted utility through UPS input 501. This is necessary to prevent: (1) the safety hazard that would be presented by energizing the faulted input lines, (2) the disruption to the critical load caused by being connected to the faulted lines, and (3) damage to or destruction of various UPS components, including fuses (not shown) contained in output inverter 511. When the utility disconnect switch 502 is naturally commutated, e.g., is constructed with SCRs, the voltage collapse at input 501 associated with many types of faults in combination with the voltage generated by output inverter 511 naturally causes the switching devices 502a and 502b to commutate. This is so because the voltage on the UPS bus will be higher in magnitude than that on the faulted input line, thereby driving the current through the SCR to zero.

However, for certain types of faults, as described above, the voltage at input 501 may increase in magnitude, thus preventing the natural commutation of the SCRs 502, because the utility voltage is forcing the line current to increase in magnitude, rather than approaching zero. If the magnitude of this fault is within the correction range of the series inverter 507, it is possible for the series inverter to block the disturbance from reaching the system output bus. The correction range of the series inverter is limited by design, primarily due to economic and efficiency concerns. Therefore, in most applications, input faults that cause transients outside the correction range of the series inverter can be expected. To minimize the impact of this transient, the present invention uses one or both of the inverters 507 and 511 to force commutate the utility disconnect switch. Without the ability to quickly open the input switch, the series inverter is susceptible to output faults; that is, an output short will cause the input line voltage to be imposed across the series inverter. This voltage may be greater than the rating of the series inverter and may cause damage to it. A method of commutating static switch thyristors using an inverter in a UPS is disclosed in U.S. Pat. No. 4,782,241.

One method of commutating the utility disconnect is to use only the main inverter 511. When a fault is detected that causes the voltage at the input 501 to change such that the line current will increase in magnitude, the main inverter controller 521 commands the main inverter switches to a state that applies a voltage that causes the inverter current to approach the load current. When the inserter current equals the load current, line current will have been forced to zero, and commutation will have been achieved. In practice, it is only necessary for the controller 521 to have knowledge of the direction of the line current and to select the inverter switch that provides the same voltage polarity as the line current polarity. Although the resulting voltage transient seen at output 515 is somewhat extreme, the short duration required is such that the load is not disrupted. Nor should the inverter extreme overcurrent stress. Typical SCRs used for static switch applications will commutate and be capable of blocking applied voltage in a few hundreds of microseconds.

The critical load disruption may also be minimized using the series inverter controller 517 controlling only the series inverter 507. However, the limited ratings of series inverter 507 require that the fault be detected early before the voltage at input 501 is out of the range in which the series inverter has sufficient capacity to force commutate the input SCRS. Another alternative for minimizing disruption to the critical load is to use the series inverter at its maximum capacity and make up the additional energy required to null the current flow, the SCRs using the main inverter. Because the series inverter is also used to null the current flow, the requirements on the main inverter are reduced, thereby reducing the output voltage distortion seen by the critical load and likely providing faster commutation.

Figure 6:
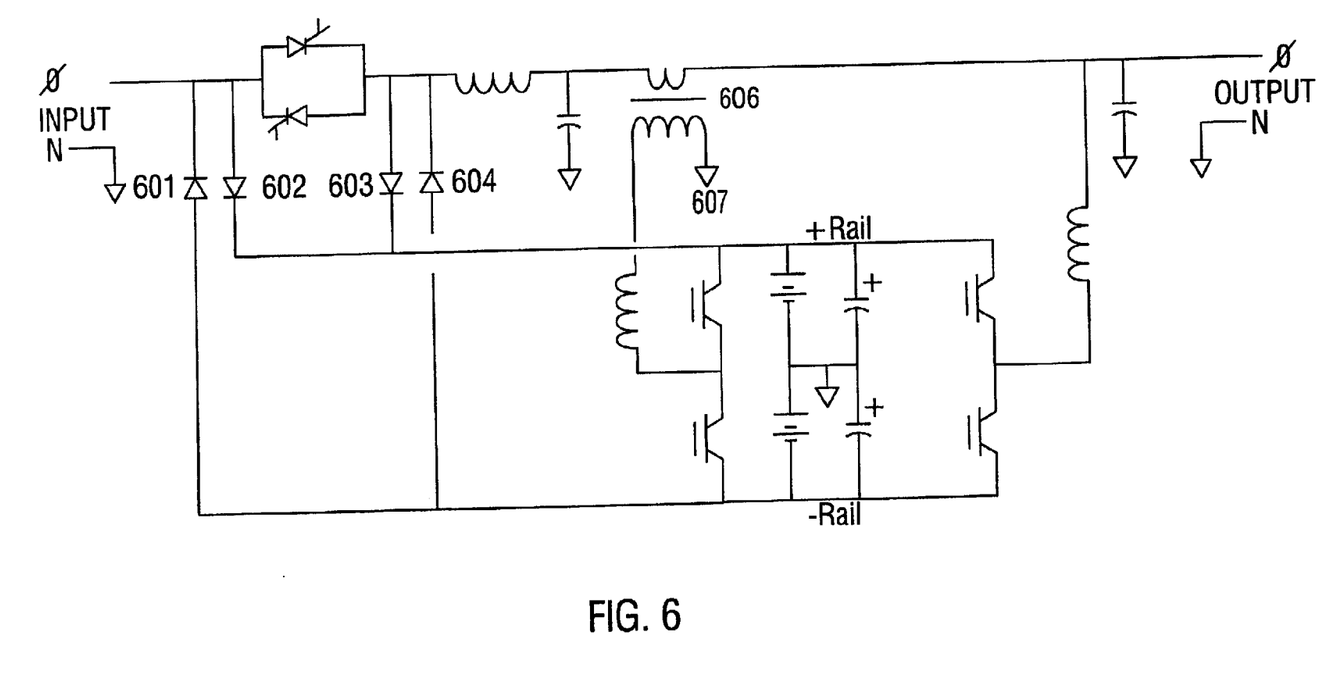
FIG. 6 is a one-line diagram of a line interactive, delta conversion UPS employing a self commutated fast utility disconnect switch and one alternative snubber circuit in accordance with the present invention.

The fast utility disconnect may also be constructed using gate commutated switching devices, such as power transistors. This alternative embodiment is illustrated in FIG. 6. A gate commutated switching device differs from a naturally commutated switching device in that the device may be turned off simply by removing the gate pulse. Those skilled in the art recognize that a gate commutated switch may also be made using SCRs employing forced commutation.

Because a gate commutated switch may be opened when current is flowing through the device, it is usually necessary to add some type of clamping circuit to the switch to prevent its destruction from interrupting the current. However, if the equivalent inductance seen by the switching devices is sufficiently low, the switching devices can safely interrupt the current without damage, and a clamping circuit is not required.

One possible clamping circuit is shown in FIG. 6, and comprises four diodes 601, 602, 603, and 604. Diodes 601 and 602 are connected between the input of the fast utility disconnect and the DC bus. Diodes 603 and 604 are connected between the output 6f the fast utility disconnect switch and the DC bus. The diodes are arranged such that a voltage excursion greater than either the positive or negative DC bus voltage on either side of the fast utility disconnect will be clamped to the DC bus voltage. The excess energy from such a voltage excursion will be absorbed by the battery 508 and DC bus capacitors 510a and 510b.

Figure 7:
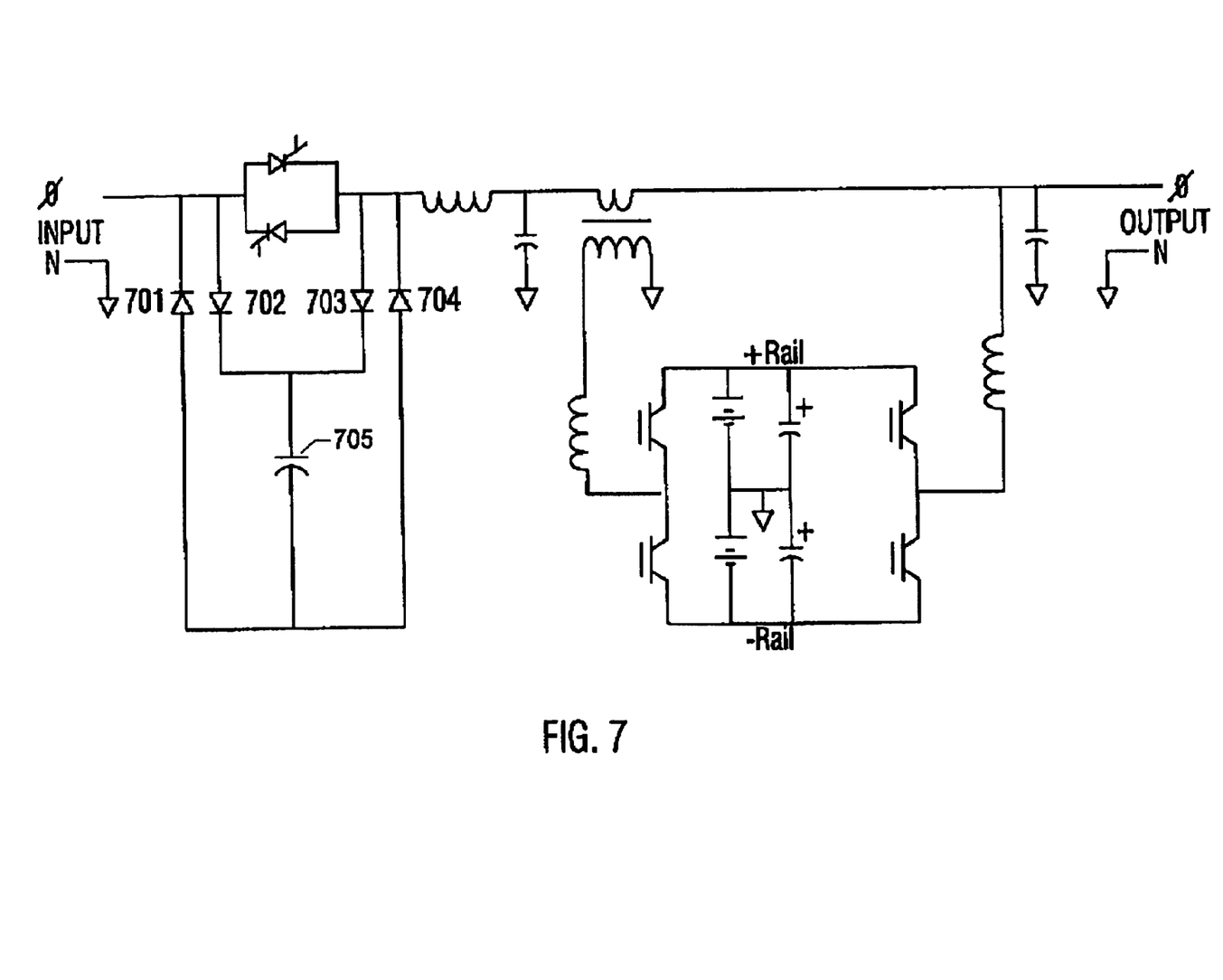
FIG. 7 is a one-line diagram of a line interactive, delta conversion UPS employing a self commutated fast utility disconnect switch and another alternative snubber circuit in accordance with the present invention.

An alternative clamping circuit is shown in FIG. 7. The clamping circuit comprises four diodes 701, 702, 703, and 704 and a capacitor 705. The principle of operation is similar to that described above. Diodes 701 and 702 connect the input side of the utility disconnect switch to capacitor 705, and diodes 703 and 704 connect the output side of the utility disconnect switch to capacitor 705. During normal operation, capacitor 705 well charge to the peak AC voltage supplied at input 501. If a larger voltage is impressed on either side of the input static switch, as would be presented by the interruption of the load current by the utility disconnect switch, the appropriate diode begins to conduct and the excess energy associated with the voltage excursion is absorbed by capacitor 705.

Figure 9:
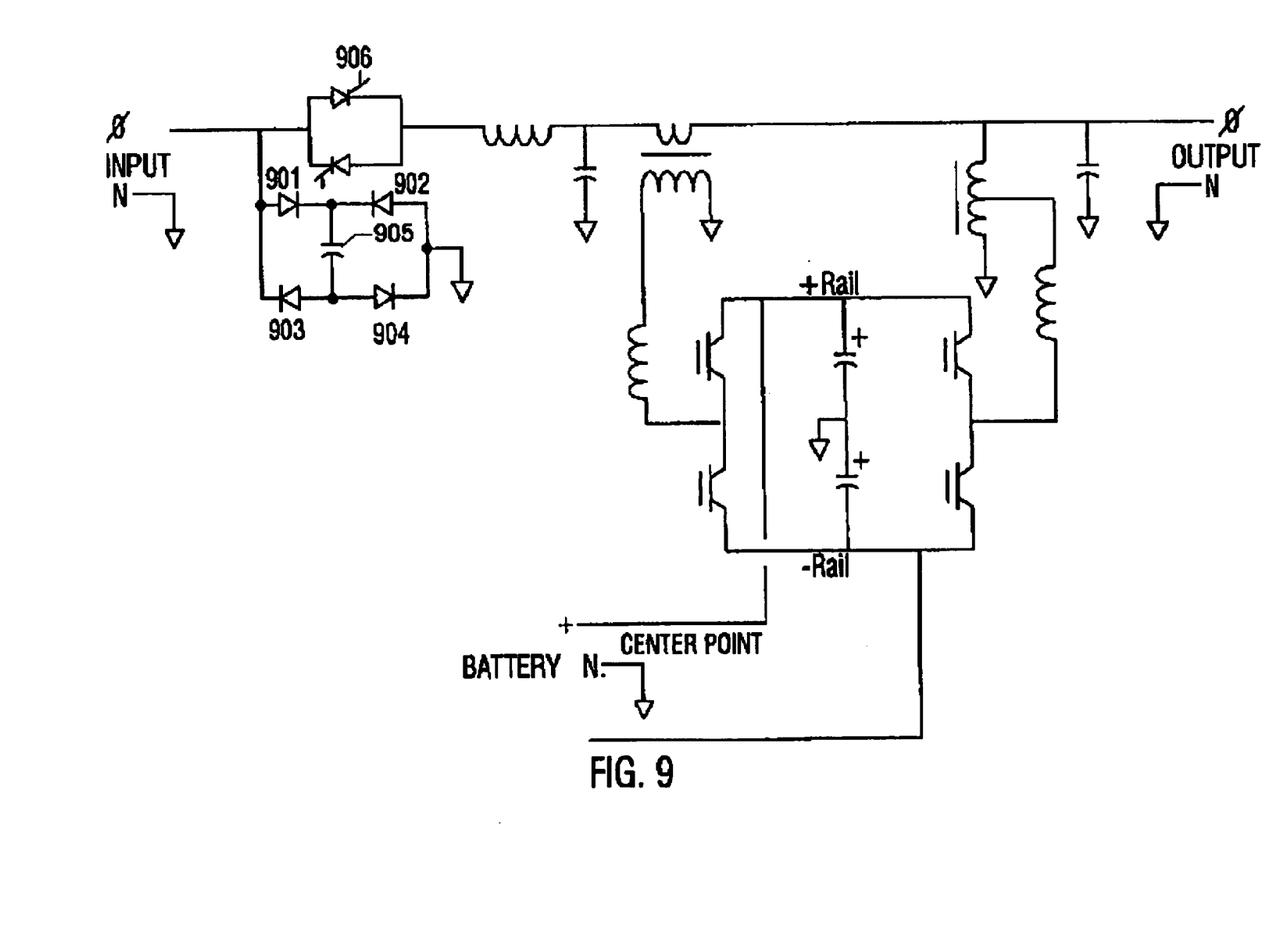
FIG. 9 is a one-line diagram of a line interactive, delta conversion UPS employing a self commutated fast utility disconnect switch and another alternative snubber circuit in accordance with the present invention.

Another possible clamp for a self commutatod fast utility disconnect in FIG. 9. The clamping circuit comprises four diodes 901–904 and capacitor 905. The anode of diode 901 is coupled to the input side of the fast utility disconnect 906, and the cathode is coupled to a first terminal of capacitor 905. Similarly, the cathode of diode 903 is coupled to the input side of fast utility disconnect 906, with the anode coupled to a second terminal of capacitor 905. Diode 902 has its cathode coupled to the first terminal of capacitor 905 and its anode coupled to ground, while diode 904 has its anode coupled to the second terminal of capacitor 905 and its cathode coupled to ground. In operation, a transient voltage excursion at the input side of fast utility disconnect 906 will cause diode 901 (for positive voltage excursions) or diode 902 (for negative voltage excursions) to conduct and allowing capacitor 905 to absorb the energy of the transient voltage excursion, and excess energy is dissipated to ground through diodes 904 (for positive voltage excursions) or diode 903 (for negative voltage excursions).

Figure 10:
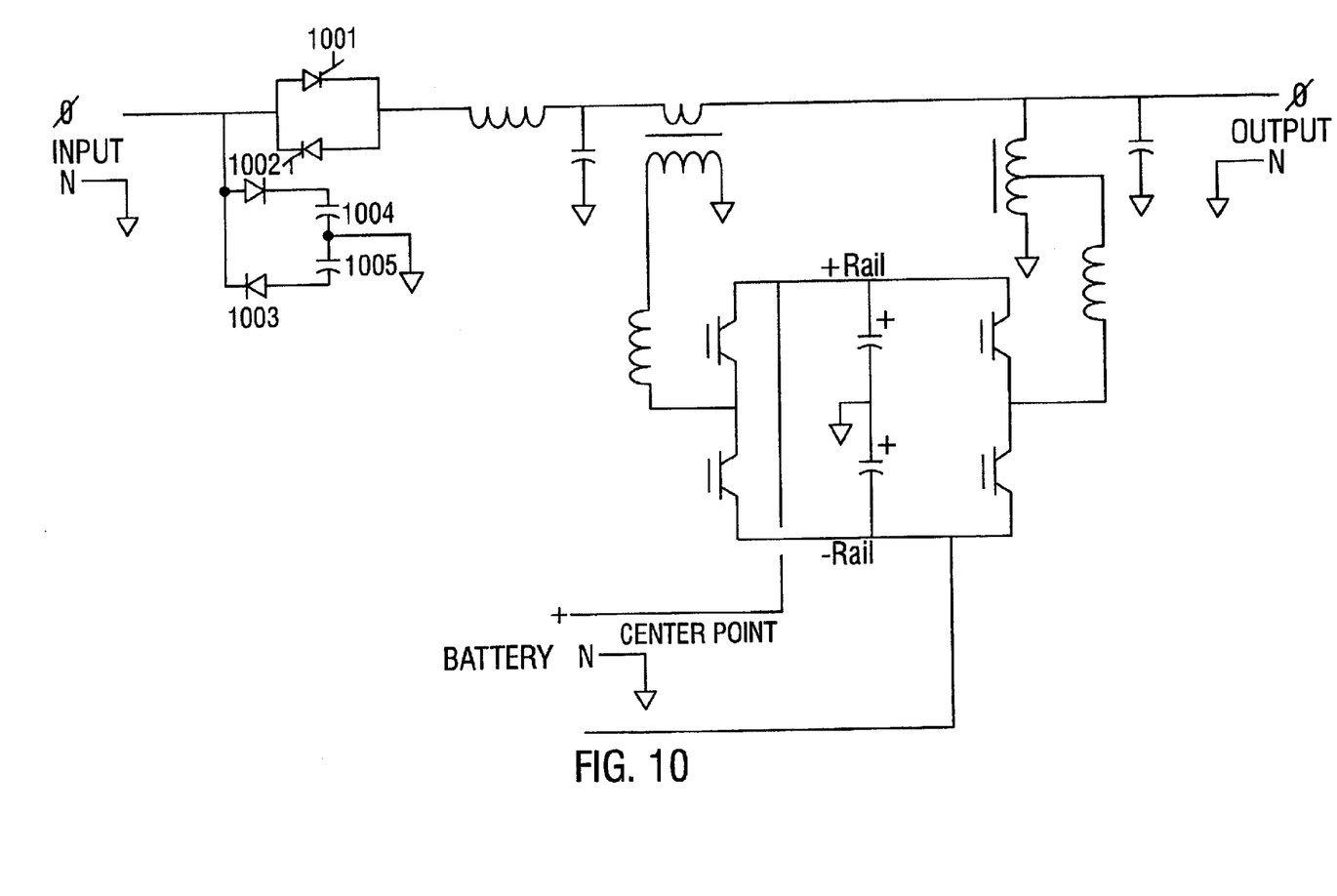
FIG. 10 is a one-line diagram of a line interactive, delta conversion UPS employing a self commutated fast utility disconnect switch and another alternative snubber circuit in accordance with the present invention.

Another clamping circuit for use with a self-commutated fast utility disconnect switch is illustrated in FIG. 10. The clamping circuit is connected to the input side of fast utility disconnect 1001 and comprises diodes 1002 and 1003 and capacitors 1004 and 1005. Diode 1002 has its anode coupled to the input side of fast utility disconnect 1001 and its cathode coupled to a first terminal of capacitor 1004. Similarly diode 1003 has its cathode coupled to the input side of fast utility disconnect 1001 and its anode coupled to a second terminal of capacitor 1005. The second terminal of capacitor 1004 and the first terminal of capacitor 1005 are coupled together and are coupled to ground. In the event of a transient voltage excursion associated with the inductive reactance of the power line circuit and caused by commutation of the fast utility disconnect, diode 1002 (for positive voltage excursions) or diode 1003 (for negative voltage excursions) will conduct allowing capacitor 1004 or 1005 respectively to absorb the energy associated with the transient voltage excursion.

Figure 11:
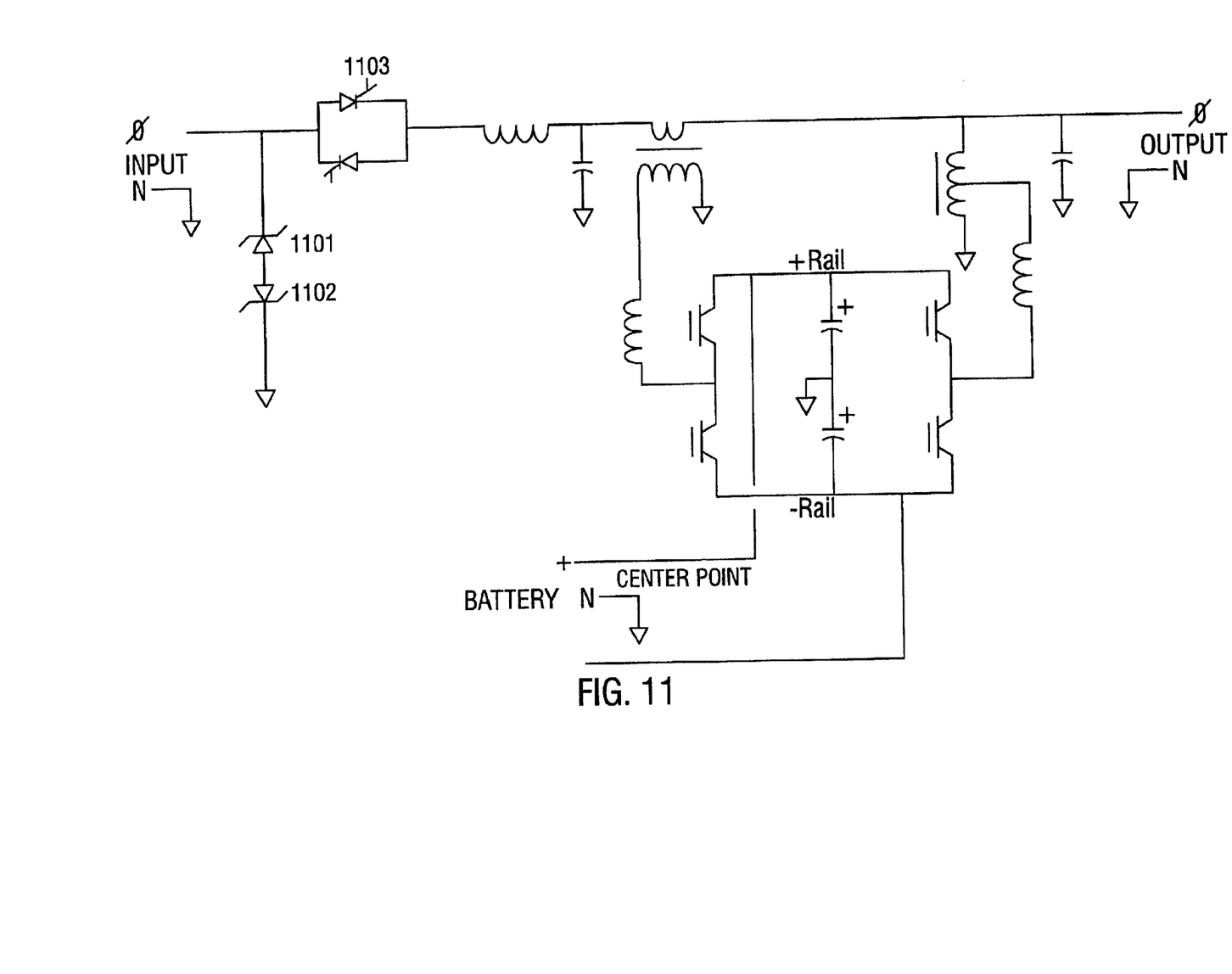
FIG. 11 is a one-line diagram of a line interactive, delta conversion, UPS employing a self commutated fast utility disconnect switch and another alternative snubber circuit in accordance with the present invention.

Finally, another clamping circuit for use with a self commutated fast utility disconnect is illustrated in FIG. 11. The clamping circuit comprises two voltage limiting diodes 1101 and 1102 connected to the input side of fast utility disconnect 1103. The cathode of voltage limiting diode 1101 is coupled to the input of fast utility disconnect 1103, with the anode being coupled to the anode of voltage limiting diode 1102 The cathode of voltage limiting diode 1102 is coupled to ground, allowing either positive or negative transient voltage excursions to be sunk to ground.

The voltage limiting diodes 1101 and 1002 could be replaced with any other bi-directional transient voltage suppression device, for example, varistors, including metal oxide varistors, back-to-back transorbs, breakdown diodes (Shockley diodes, diacs), carbon piles, gas discharge devices, etc.

Figure 8:
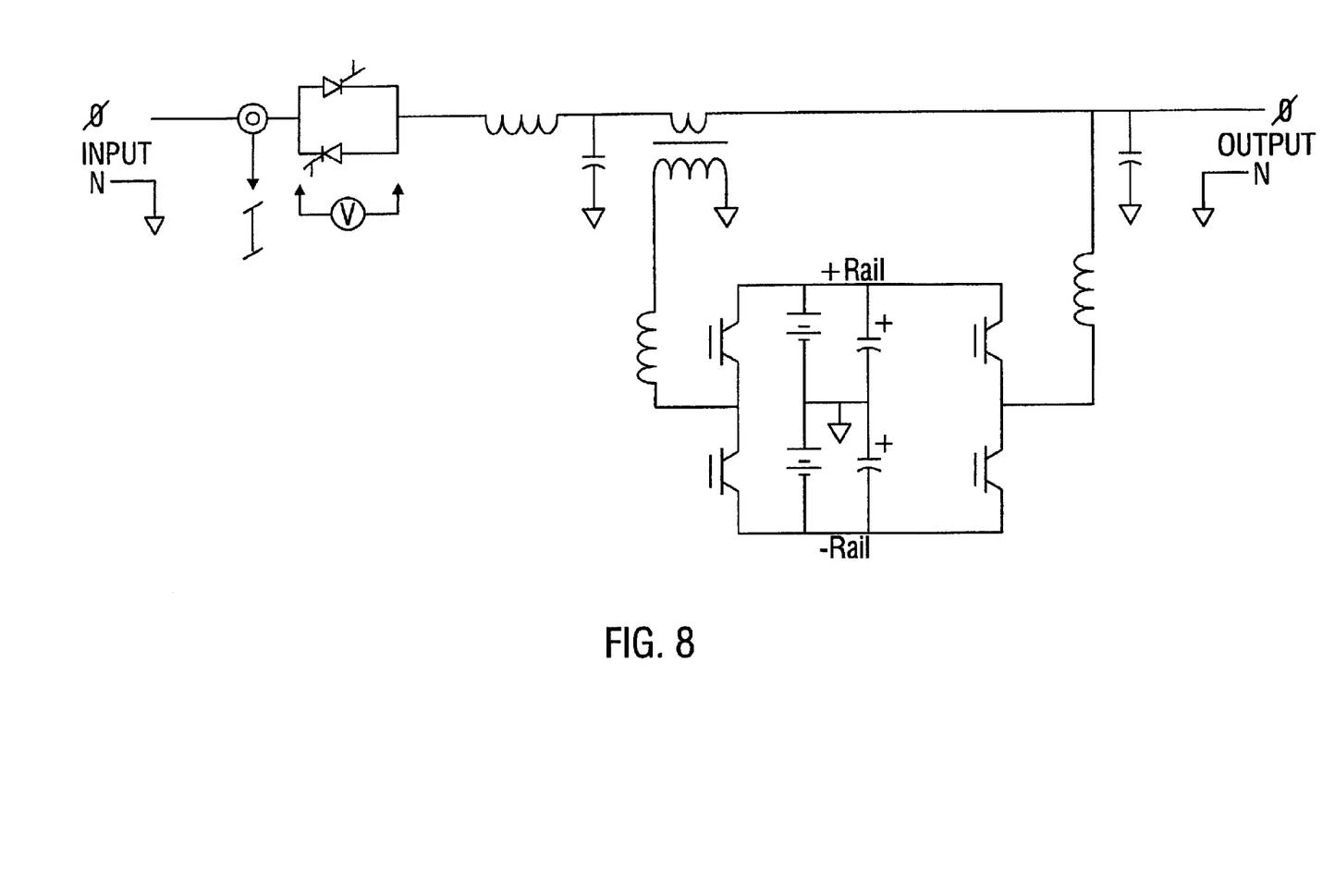
FIG. 8 is a one-line diagram of a line interactive, delta conversion UPS illustrating connection of a current or voltage sensor used in control of the fast utility disconnect.

To force or assist commutation of the static switch, it is necessary to know the direction of the current flowing through the static switch. One way of determining the current direction is to use a current sensor that produces an analog signal. Connection of such a sensor 801 is illustrated in FIG. 8. Alternatively, the direction of the current can be determined by observing the voltage across the static switch. Connection of the required voltage sensor 802 is also illustrated in FIG. 8. The voltage sensor technique is preferred, as it is less sensitive to offset errors.

Additional modifications and adaptations of the present invention will be obvious to one of ordinary skill in the art, and it is understood that the invention is not to be limited to the particular illustrative embodiments set forth herein. It is intended that the invention embrace all such modified forms as come within the scope of the following claims.

References

The following references, to the extent that they provide exemplary procedural or other details supplementary to those set forth herein, are specifically incorporated herein by reference.

U.S. Pat. No. 4,782,241, entitled "Uninterruptible Power Supply Apparatus and Power Path Transfer Method."

What is claimed is:

1. An uninterruptible power supply having an input connected to an input power source and an output connected to a critical load, the uninterruptible power supply comprising:
   a) a utility disconnect static switch comprising two silicon controlled rectifiers connected in anti-parallel coupled between the input and an input bus;
   b) a battery bus;
   c) an inverter coupled between the battery bus and the output; and
   d) an inverter controller that, upon detection of an input power source fault causing an input voltage magnitude increases, controls the inverter to generate on the input bus a voltage of the same polarity and greater magnitude than the input voltage, thereby commutating the utility disconnect static switch.

2. The uninterruptible power supply of claim 1 further comprising:
   a) a transformer having first and second windings, the first winding series coupled between the utility disconnect static switch and the output, and the second series winding having a first terminal coupled to ground;
   b) a series inverter coupled between a second terminal of the second winding and the battery bus; and
   c) a series inverter controller that, upon detection of an input power source fault causing an input voltage magnitude increase, controls the series inverter to generate on the input bus a voltage of the same polarity and greater magnitude than the input voltage, thereby commutating the utility disconnect static switch.

3. A method of preventing fault propagation through a utility interactive UPS having an inverter and a utility disconnect static switch with an input terminal supplied with an input power signal and an output terminal, the method comprising the steps of:
   sensing a characteristic of the input power signal;
   detecting a change in the sensed characteristic indicating a fault that causes an increase in the voltage of the input power signal;
   controlling the inverter to generate on the output terminal of the utility disconnect static switch a voltage having a polarity the same as and a magnitude greater than the faulted input voltage, thereby commutating the static switch.

4. The method of claim 3 wherein the UPS comprises a second inverter, the method further comprising:
   controlling the second inverter to generate on the output terminal of the utility disconnect static switch a voltage having a polarity the same as and a magnitude greater than the faulted input voltage, thereby commutating the static switch.

5. The method of claim 3 wherein the sensed characteristic is a voltage across the static switch.

6. The method of claim 3 wherein the sensed characteristic is a current through the static switch.

7. The method of claim 4 wherein the sensed characteristic is a voltage polarity across the static switch.

8. The method of claim 4 wherein the sensed characteristic is a current direction through the static switch.

9. An uninterruptible power supply having an input connected to an input power source and an output connected to a critical load, the uninterruptible power supply comprising:
   a) a utility disconnect static switch coupled between the input and an input bus, the utility disconnect switch including two silicon controlled rectifiers connected in anti-parallel;
   b) a series inverter coupled between the input bus and a battery bus;
   c) a primary inverter coupled between the battery bus and the output; and
   d) a series inverter controller that, upon detection of an input power source fault causing an input voltage magnitude increase, controls the series inverter to generate on the input bus a voltage of the same polarity and greater magnitude than the input voltage, thereby conmmutating the utility disconnect static switch.

10. A method of preventing fault propagation through a utility interactive UPS having a series inverter and a utility disconnect static switch with an input terminal supplied with an input power signal and an output terminal, the method comprising the steps of:
    sensing a characteristic of the input power signal;
    detecting a change in the sensed characteristic indicating a fault that causes an increase in the voltage of the input power signal;
    controlling the series inverter to generate on the output terminal of the utility disconnect static switch a voltage having a polarity the same as and a magnitude greater than the faulted input voltage, thereby commutating the static switch.

11. An uninterruptible power supply having an input connected to an input power source and an output connected to a critical load, the uninterruptible power supply comprising:
    a) a utility disconnect static switch comprising two gate commutated switching devices connected in anti-parallel coupled between the input and an input bus,
    b) a utility disconnect static switch controller that, upon detection of an input power source fault causing an input voltage magnitude increase, open the gate commutated switching devices.
    c) a clamping circuit coupled to the gate commutated switching devices to minimize the transient voltage caused by opening the fast utility disconnect static switch.

12. The uninterruptible power supply of claim 11 wherein the gate commutated switching devices are power transistors.

13. The uninterruptible power supply of claim 11 wherein the gate commutated switching devices are gate turn off thyristors.

14. The uninterruptible power supply of claim 11 wherein the clamping circuit further comprises.
    a first diode having a cathode coupled to an input side of the fast utility disconnect static switch and an anode coupled to a negative battery bus;
    a second diode having an anode coupled to the input side of the fast utility disconnect static switch and a cathode coupled to the positive battery bus;
    a third diode having an anode coupled to an output side of the fast utility disconnect static switch and a cathode coupled to the positive battery bus; and
    a fourth diode having a cathode coupled to the output side of the fast utility disconnect switch and an anode coupled to the negative battery bus.

15. The uninterruptible power supply of claim 11 wherein the clamping circuit further comprises:
    a first diode having a cathode coupled to an input side of the fast utility disconnect static switch and an anode coupled to a negative terminal of a capacitor;
    a second diode having an anode coupled to the input side of the fast utility disconnect static switch and a positive terminal of the capacitor;
    a third diode having an anode coupled to an output side of the fast utility disconnect static switch and a cathode coupled to the positive terminal of the capacitor; and
    a fourth diode having a cathode coupled to the output side of the fast utility disconnect switch and an anode coupled to the negative terminal of the capacitor.

16. The uninterruptible power supply of claim 11 wherein the clamping circuit further comprises:
    a first diode having an anode coupled to an input side of the fast utility disconnect static switch and a cathode coupled to a first terminal of a capacitor;
    a second diode having a cathode coupled to the input side of the fast utility disconnect static switch and an anode coupled to a second terminal of the capacitor;
    a third diode having a cathode coupled to the first terminal of the capacitor and an anode coupled to ground; and
    a fourth diode having an anode coupled to the second terminal of the capacitor and a cathode coupled to ground.

17. The uninterruptible power supply of claim 11, wherein the clamping circuit further comprises:
    a first diode having an anode coupled to an input side of the fast utility disconnect static switch and a cathode coupled to a first terminal of a first capacitor; and
    a second diode having a cathode coupled to the input side of the last utility disconnect static switch and a cathode coupled to a second terminal of a second capacitor;
    wherein the second terminal of the first capacitor and the first terminal of the second capacitor are coupled to ground.

18. The uninterruptible power supply of claim 11, wherein the clamping circuit further comprising:
    a first voltage limiting diode having a cathode coupled to an input side of the fast utility disconnect static switch; and
    a second voltage limiting diode having an anode coupled to an anode of the first voltage limiting diode and a cathode coupled to ground.

19. A method of preventing fault propagation through a utility interactive UPS having a utility disconnect static switch comprising two gate commutated switching devices coupled in anti-parallel, the static switch having an input terminal supplied with an input power signal, the method comprising the steps of:

sensing a characteristic of the input power signal;

detecting a change in the sensed characteristic indicating a fault that causes an increase in the voltage of the input power signal;

opening the static switch to disconnect the input power signal from the UPS.

20. The method of claim 19 wherein the sensed characteristic is a voltage across the static switch.

21. The method of claim 19 wherein the sensed characteristic is a current through the static switch.

* * * * *